United States Patent Office 3,499,289
Patented Mar. 10, 1970

3,499,289
MONOPROPELLANT IN BINDER MATRIX
Robert N. Olsen, New York, N.Y., assignor to Esso Research and Engineering Company, a corporation of Delaware
No Drawing. Filed May 2, 1961, Ser. No. 107,259
Int. Cl. F23r 1/18; C06d 5/06
U.S. Cl. 60—218      10 Claims This invention relates to a solid rocket propellant formulation of hydrazine bisborane in a binder matrix of epoxy resin or with a coating thereof.

Hydrazine bisborane, represented by the formula $N_2H_4 \cdot 2BH_3$, is an interesting solid propellant or propellant ingredient. It has a high specific impulse and a low flame temperature when ignited and reacted to BN and $H_2$. This makes is useful as a monopropellant and also as a nozzle coolant in conjunction with high-temperature, high specific impulse propellants. It is useful as a hydrogen-rich ingredient in propellants employing fluorine and oxygen oxidizers which would otherwise be deficient in driving fluid.

In spite of its advantageous properties, hydrazine bisborane is difficult to utilize in practical propellant formulations because it is a brittle solid which is very easily degraded by water or water vapor. Also, as ordinarily obtained, it is an extremely fine powder, about 1 to 5 micron particles, which requires large amounts of binder in order to give anything like a fluid slurry for molding purposes. Moreover, it is quite reactive chemically, and reacts rapidly with most binder materials to give degraded products unsuitable for propellant use.

In accordance with the present invention it has been found that by using certain epoxy resins as binder for hydrazine bisborane, a resulting grain which is strong and has good water resistance is obtained. The epoxy resin protects the hydrazine bisborane against attack by water vapor; it gives the needed strength and toughness, and at the same time, can be used for bonding the grain to the rocket case. Such physical properties are desired for using hydrazine bisborane in practical rocket motors.

In formulating hydrazine bisborane with a binder, a number of factors are involved. In general, polymeric materials which react with hydrazine bisborane fail to cure to a firm grain or give low strength and are unsuitable. Epoxy resins react with HBB; (symbol used for hydrazine bisborane) but, surprisingly some of them nevertheless do make suitable binders. In certain cases, his reactivity is even favorable. For example, hydrazine bisborane acts synergistically with organic diamine curing agents for obtaining a faster hardening or setting of the resin mixture.

In using a polymer binder for hydrazine bisborane propellants, it is important to use an optimum, low concentration of the binder, e.g. 30% or less, in order to avoid a substantial decrease in the specific impulse. Preferably, the amount of binder in the grain should be in the range of 5 to 30 wt. percent. This limitation on the proportion of the binder resin or polymer has to be considered together with other characteristics, such as viscosity of the resin and compatibility with the hydrazine bisborane. If the resin has a viscosity which is too high, it is difficult to obtain intimate mixing. On the other hand, if the resin has a low viscosity, its reactivity is enhanced to the point where it may tend to decompose the hydrazine bisborane and release gas.

A number of types of polymers, resins, etc. investigated were found to be ineffective or unsuitable as binders with hydrazine bisborane even though they have been found to be useful in other cases; e.g. polyvinyl alcohol, powdered aluminum, nitrile resins, petroleum resins, synthetic hydrocarbon rubbers, methacrylate resins and polyurethanes. The hydrazine bisborane tends to prevent curing of such polymers as acrylates and urethanes.

The epoxy resins, which are suitable as hydrazine bisborane grain binders, are resins synthesized by reacting a dihydric phenol or polynuclear phenol with epichlorohydrin. About 1 to 2 mols of the epichlorohydrin is reacted with the phenol by heating at 50° C. to 150° C. in the presence of a base, such as sodium hydroxide. As the heating is continued, the resulting product which is a mixture of glycidyl ethers becomes more viscous and then taffy-like in consistency. The prototype of the epoxy resins is made by reacting bis-(4-hydroxyphenyl)-2,2-propane with epichlorohydrin and the resulting resin is represented by the recurrent unit formula

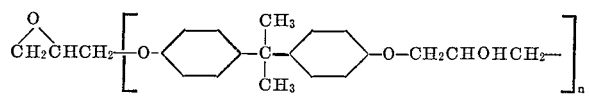

wherein $n$ is the number of units. The terminal groups may be epoxide groups or phenol groups depending on the proportions of the reactants. These resins are available products of commerce in the form of liquids to solids of different molecular weights, such as from about 450 to 2000 and higher. More detail is given on the epoxy resins in U.S. Patent 2,444,333 of Castan, granted June 29, 1948 and in U.S. Patent 2,500,600 of Bradley, patented Mar. 14, 1950.

In using epoxy resins (or anything else) as a binder for hydrazine bisborane, it is very important to avoid the use of curing temperatures high enough to decompose the hydrazine bisborane. There are wide variations in the thermal stability of hydrazine bisborane, depending on the method of manufacture, past storage conditions, and other factors not yet well understood. If the particular hydrazine bisborane sample is not adequately stable at elevated temperatures, the curing has to be done under ordinary temperatures, e.g. room temperature or in the range of about 20° to 30° C. If the hydrazine bisborane has better thermal stability, more rigorous conditions of curing can be used, i.e., temperatures ranging up to say 50° C. to shorten the mixing time and the setting time.

More stable hydrazine bisborane has been made available through improved methods of preparation which yield higher purity crystals. In one improved preparation of hydrazine bisborane, a hydrazine salt is reacted with an alkali metal borohydride in a cyclic ether diluent, e.g. tetrahydrofuran or dioxane, under strictly anhydrous conditions. The hydrazine bisborane is thereafter precipitated from the ether in the form of a solvate, washed free of impurities by dioxane, and then dried under vacuum. Another method which may be used for stabilizing hydrazine bisborane, involves heating the hydrazine bisborane to a temperature in the range of about 50° C. to 90° C., for a limited time to decompose impurities. This converts the more unstable portion of the hydrazine bisborane to hydrazino bisborane which is relatively stable.

Epoxy resins which were used for test purposes are commercially available resins which may be described as medium molecular weight polymers whose chains are terminated in epoxide structures. They differ in molecular weight, which is usually expressed in terms of viscosity. One typical epoxy resin indicated by (1) has a viscosity in the range of 135 to 145 poises at 25° C. Another epoxy resin used indicated by (2) has a viscosity in the range of 40 to 100 poises at 25° C. The epoxy resin indicated by (3) is an aliphatic analog of the epoxy resins containing biphenyl groups, and its viscosity is given as 450 to 600 centipoises at 25° C. Resins of significantly higher viscosities than the ones used were found to be too viscous to permit adequate blending unless a diluent was used; and diluents are troublesome to remove. Resins of significantly lower viscosity were too reactive and degraded the hydrazine bisborane to an unacceptable extent, resulting in porous grains.

The organic polyamine hardening agents are generally used in a concentration of about 5 to 15 parts per 100 parts by weight of the epoxy resin. They cross-link the resin by reacting with the epoxide linkages.

For the purpose of testing epoxy resin/hydrazine bisborane formulations, grains of hydrazine bisborane molded by itself and in the resin formulation were made. The grains were made by compressing the materials into bars which were then cured and strength tested. The resin formulations were compression molded after initial hardening of the thin paste to a stiff paste had occurred but before final setting had taken place. The bars were cured under moisture-free conditions at room temperature for a period of 5 to 7 days.

A summary of formulations and test results is given in the following table:

TABLE I.—GRAIN STRENGTH TEST
[Effects of epoxy resins and curing agents on hydrazine bisborane (HBB)]

| HBB Mortar Ground Formulation | Modulus of Rupture (p.s.i.) | Properties |
| --- | --- | --- |
| (1) HBB | 660–880 | Highly moisture sensitive. Crumbles into many pieces on strength testing. |
| (2) 3.07% triethylene tetraamine, 21.93% Epoxy Resin (1), 75.00% HBB. | 1,415 | Moisture resistant. Breaks into 2 pieces on strength testing. |
| (3) 3.07% m-phenylene diamine, 21.93% Epoxy Resin (1), 75.00% HBB. | 1,050 / 1,130 | Do. |
| (4) 1.6% m-phenylene diamine, 12.6% Modified Epoxy Resin (3), 5.8% Epoxy Resin (1), 80.0% HBB. | 931 | Do. |
| (5) 2.0% m-phenylene diamine, 15.8% Modified Epoxy Resin (3), 7.2 Epoxy Resin (1), 75.0% HBB. | 1,060 | Do. |
| (6) 1.5% triethylene tetraamine, 4.7% Epoxy Resin (1), 18.8% Modified Epoxy Resin (3), 75.0% HBB. | 1,140 / 1,133 | Do. |
| (7) 2.5% m-phenylene diamine, 17.5% Epoxy Resin (2), 80.0% HBB. | 1,093 / 1,196 | Do. |
| (8) 1.8% m-phenylene diamine, 13.2% Epoxy Resin (1), 85.0% HBB. | 864 | The epoxy mix was thinned with benzene and after mixing with HBB a vacuum was used to pull off this solvent. The bar gave a break into 2 pieces on strength testing. |

The foregoing tests showed that the epoxy resin binders not only greatly strengthened the molded bars but also imparted a degree of toughness or elasticity. This is evidenced by the mode of rupture in which bars containing none or inadequate amounts of epoxy resin crumbled into many pieces, whereas the bars containing the resin sufficiently cured broke only into two pieces.

For a moisture resistance test at piece of the bar was placed in water. The moisture resistant bars containing the epoxy resin remained intact and in their original shapes for 36 hours. Under the same conditions a bar of HBB without the epoxy resin binder disintegrates completely in a few minutes.

Standard burning rates showed that the formulations containing the epoxy resin binder have a satisfactory burning rate, similar to that of the HBB.

BURNING RATES OF HBB PELLETS

| Pellet Composition | Pressure, p.s.i. | Burning Rate, in./sec. |
| --- | --- | --- |
| 100% HBB | 500 | 0.45 |
|  | 750 | 0.60 |
|  | 1,000 | 0.70 |
|  | 1,500 | 0.82 |
| 75% HBB, 25% Epoxy Resin | 500 | 0.58 |
|  | 1,000 | 0.48 |

These data are insufficient to delineate accurately the true burning rate of HBB/epoxy mixes, but they are sufficiently accurate to show that the burning rate of HBB/epoxy is not radically different from that of HBB alone, i.e., the data for HBB/epoxy are within reasonable limits of repeatibility for agreement with HBB alone.

By using a thinning solvent, such as benzene, for lowering the viscosity of the epoxy resin, better mixing is obtained with the ground HBB and the binder content can be reduced to 15 wt. percent or lower. This is exemplified by mix No. 8 in Table I.

Mixes of finely-divided hydrazine bisborane and organic diamines with epoxy resin have a faster set or hardening time than would be expected from individual performances of the hydrazine bisborane per se and of the organic diamine per se. This synergistic property is valuable in decreasing the amount of diamine needed and in accelerating the set and cure.

The synergism is shown by the shortened time interval between mixing and initial set. By virtue of the synergism the mix quickly hardens to a stiff paste which is easily compression molded. Thus the production time cycle is shortened and made more practical; also, there is less time for degradation of the HBB. The synergistic effect is demonstrated in the results in the following table.

TABLE II.—EFFECTS OF ORGANIC DIAMINE AND HYDRAZINE BISBORANE (HBB) ON HARDENING TIME
[Demonstration of synergism]

| HBB Mortar Ground Formulation (Soft Paste Consistency) | Time Required for Initial Hardening of the Soft Paste to a Stiff Paste, Hrs. | Nominal Hardening Time, Hrs. |
| --- | --- | --- |
| (1) 3.07% m-phenylene diamine, 21.93% Epoxy Resin (1), 75.00% HBB | ¾ | ¾ |
| (2) 3.07% Powdered Polypropylene, 21.93% Epoxy Resin (1), 75.00% HBB. | Soft at 30 Hrs., Set at 46½ Hrs. | 40 |
| (3) 3.07% m-phenylene diamine, 21.93% Epoxy Resin (1), 75.00% Powdered Polypropylene. | Soft at 7 Hrs., Set at 21½ Hrs. | 14 |
| (4) 3.07% m-phenylene diamine, 21.93% Epoxy Resin (1), 75.00 HBB. | ¾ | ¾ |
| (5) 78.07% m-phenylene diamine, 21.93% Epoxy Resin (1). | Soft at 8½ Hrs., Set at 11¾ Hrs. | 10 |
| (6) 78.07% HBB, 29.93% Epoxy Resin (1). | Soft at 48 Hrs., Set at 43½ Hrs. | 36 |

Any of the conventional organic diamine curing agents may be used. Among these curing agents are various saturated aliphatic diamines. Other organic diamine curing agents have the amino groups attached to other types of hydrocarbon radicals and heterocyclic radicals. There is a variation in the performance of the organic amine curing agents and in general, a stronger grain is obtained if the mix containing the epoxy resin with the selected curing agent is set or hardened in a shorter time. This effect is shown in the following table:

TABLE III.—EFFECT OF CURLING AGENTS ON EPOXY BINDERS
[25 wt. percent of epoxy resin binder in each formulation]

| Curing agent | Time to initial set | Modulus of Rupture, p.s.i |
| --- | --- | --- |
| None | 24 to 40 Hrs | 506 |
| 4.1 wt. percent Commercial | 5 Hrs | 705 |
| 3 wt. percent m-phenylene diamine | ¾ Hr | 1,130 |
| 3 wt. percent Triethylene tetramine | 10 mins | 1,415 |

Instead of using the epoxy resins as a matrix with the hydrazine bisborane completely dispersed therein, the hydrazine bisborane may be separately shaped into small pellets, discs, cylinders or other kinds of shapes and then be coated with the epoxy resin mixed with an organic amine curing agent. The hydrazine bisborane may be formed into the shaped pellets or grains with an admixture of compatible polymer such as polyethylene or with a portion of epoxy resin and thereafter the hydrazine bisborane may be coated with a film or shell of the epoxy resin which then forms a cured surface coating. Hydrazine bisborane as a monopropellant has a calculated specific impulse of about 284 seconds. It may also be mixed with powdered metal fuels, such as aluminum powder, or mixtures of finely-divided metal particles, such as magnesium and aluminum, and with finely-divided solid oxidizers, such as ammonium perchlorate in order to give increased performance as is well known in the art. Such mixtures may then be mixed with the resin binder for shaping, using known techniques such as casting, molding or extruding.

Other variations and modifications common within the spirit and scope of the invention may be used.

What is claimed is:

1. A solid rocket propellant formulation of at least about 75 wt. percent of hydrazine bisborane in a binder matrix of about 5 to 25 wt. percent of epoxy resin having a viscosity of about 4.5 to 145 poises at 25° C.

2. A composition comprising at least about 75 wt. percent of finely-divided hydrazine bisborane particles mixed with about 5 to 25 wt. percent of an epoxy resin having a viscosity of about 4.5 to 145 poises at 25° C. and with about 1 to 5 wt. percent of an organic diamine curing agent.

3. Composition as defined in claim 2, in which the hydrazine bisborane is at least 75 wt. percent, the epoxy resin is about 5 to 25 wt. percent and the organic diamine curing agent is about 1 to 5 wt. percent of the mixture.

4. A method for preparing a shaped and strengthened composite containing hydrazine bisborane which comprises mixing at least about 75 wt. percent of ground hydrazine bisborane particles with about 5 to 25 wt. percent of an epoxy resin having a viscosity of about 4.5 to 145 poises at 25° C. and with about 1 to 5 wt. percent of an organic diamine curing agent for the epoxy resin to form a paste of the thus mixed ingredients, initially hardening the paste to a stiff mix suitable for compression molding, and then molding it into a shaped grain.

5. A shaped grain of at least about 75 wt. percent of hydrazine bisborane dispersed in a binder of about 5 to 25 wt. percent of cured epoxy resin, said resin before curing having a viscosity of about 4.5 to 145 poises at 25° C. and being cured with about 5 to 15 wt. percent of an organic polyamine curing agent based on the weight of the resin.

6. A shaped grain of hydrazine bisborane coated by a cured epoxy resin, said resin having a viscosity before curing of about 4.5 to about 145 poises at 25° C. and being cured with about 5 to 15 wt. percent of an organic polyamine based on the weight of the resin.

7. A composition comprising a cured intimate mixture of about 85% to 95% by weight hydrazine bisborane and about 5% to 15% by weight of an organic polymeric binder.

8. A composition according to claim 7 wherein said organic polymeric binder is an epoxy resin.

9. The method of operating a gas generator whereby large quantities of gas are produced, said method comprising elevating the temperature of a composition consisting essentially of a cured intimate admixture of about 85 to about 95% by weight hydrazine bisborane and about 5 to about 15% by weight of an organic polymeric binder.

10. The method according to claim 9 wherein said binder is an epoxy resin.

References Cited

UNITED STATES PATENTS 3,170,283   2/1965   Sayles _____ 149—22 XR

BENJAMIN R. PADGETT, Primary Examiner

U.S. Cl. X.R.

60—219; 149—6, 19, 22, 36, 44